(12) United States Patent
Gildfind et al.

(10) Patent No.: US 7,590,775 B2
(45) Date of Patent: Sep. 15, 2009

(54) METHOD FOR EMPIRICALLY DETERMINING A QUALIFIED BANDWIDTH OF FILE STORAGE FOR A SHARED FILED SYSTEM

(76) Inventors: Andrew Joseph Alexander Gildfind, C/- SGI Australia, 357 Camberwell Road, Camberwell, Vic (AU) 3124; Ken John McDonell, C/- SGI Australia, 357 Camberwell Road, Camberwell, Vic (AU) 3124

( * ) Notice: Subject to any disclaimer, the term of this patent is extended or adjusted under 35 U.S.C. 154(b) by 831 days.

(21) Appl. No.: 10/912,722

(22) Filed: Aug. 6, 2004

(65) Prior Publication Data

US 2006/0028987 A1 Feb. 9, 2006

(51) Int. Cl.
G06F 15/173 (2006.01)
G06F 7/00 (2006.01)
H04L 12/26 (2006.01)

(52) U.S. Cl. .............. 710/29; 710/72; 710/73; 710/74; 709/225; 709/226; 709/229

(58) Field of Classification Search ............. 710/72–74, 710/29; 709/225, 226, 229
See application file for complete search history.

(56) References Cited

U.S. PATENT DOCUMENTS

| 5,907,683 | A * | 5/1999 | Engelsiepen et al. | 709/231 |
|---|---|---|---|---|
| 6,788,688 | B2 * | 9/2004 | Trebes, Jr. | 370/395.1 |
| 6,804,717 | B1 * | 10/2004 | Bakshi et al. | 709/225 |
| 7,280,561 | B2 * | 10/2007 | Sahinoglu | 370/468 |
| 7,310,678 | B2 * | 12/2007 | Gunaseelan et al. | 709/230 |
| 2003/0078946 | A1 | 4/2003 | Costello et al. | |
| 2003/0093526 | A1* | 5/2003 | Nandagopalan et al. | 709/225 |
| 2003/0212792 | A1 | 11/2003 | Raymond | |
| 2005/0086362 | A1* | 4/2005 | Rogers | 709/235 |

OTHER PUBLICATIONS

"An Empirical Evaluation of Virtual Circuit Holding Times in IP over ATM Networks," Proc. of INFOCOM 1994, Y. Afek, M. Cohen, E. Haalman, Y. Mansour.*

SGI Infinitestorage filesystem CXFS (pdf file at: http://www.sgi.com/pdfs/2816.pdf)-uploaded Apr. 2004.

Eppe, Eric: Delivery Guaranteed-rate I/0 to SANS in Video and Film Postproduction Facilities (pdf file at: http://www.sgi.com/pdfs/3647.pdf)-uploaded Apr. 2004.

(Continued)

Primary Examiner—Tammara Peyton
(74) Attorney, Agent, or Firm—Sunstein Kann Murphy & Timbers LLP

(57) ABSTRACT

A method for preventing oversubscription to a file storage by multiple processes, whether such processes are operating on one node with directly attached storage or on several nodes of a computing cluster sharing a storage area network. Processes or nodes issue requests for bandwidth reservations to a controller daemon. The controller daemon maintains records of all existing bandwidth reservations and ensures that new reservations are granted only if a qualified bandwidth of the file storage will not be exceeded. The qualified bandwidth is empirically determined to take into account installation specific hardware configurations, workloads, and quality of service requirements. In conjunction with suitable enabled client kernels the controller daemon serves to encapsulate all I/O activity including non-reserved I/O activity to the file storage by issuing non-guaranteed bandwidth leases for use by each node in servicing non-guaranteed process I/O activity, such leases being revokable by the controller daemon in order to service new guaranteed bandwidth reservation requests.

11 Claims, 8 Drawing Sheets

OTHER PUBLICATIONS

Johnson, Lori Guaranteed-rate 1/0 Version 2 Guide—Version 001, Feb. 2004-Available online at: http://techpubs.sgi.com/library/tpl/cgi-bin/init.cgi.

Irix 6.5.23 Man. pages-uploaded to website Jan. 14, 2004-Feb. 3, 2004-Available online at: http://techpubs.sgi.com/library/tpl/cgi-bin/init.cgi.

* cited by examiner

METHOD FOR EMPIRICALLY DETERMINING A QUALIFIED BANDWIDTH OF FILE STORAGE FOR A SHARED FILED SYSTEM

FIELD OF THE PRESENT INVENTION

The present invention relates to utilisation of file systems such as directly attached storage (DAS) or shared file systems accessible by a plurality of nodes, and in particular provides a method and system for utilisation access to such file systems for priority processes, lower priority access requirements and minimising hardware requirements.

BACKGROUND OF THE PRESENT INVENTION

A Storage Area Network (SAN) is a dedicated, specialized network for transporting data at high speeds between a plurality of disks and a plurality of computers or nodes, termed a cluster. A typical SAN only allows each node to see its own zone or subsection of the SAN, which may comprise one or more volumes of the SAN. Each volume is a set of disks configured to appear as a single disk. A volume of the SAN may not be accessed concurrently by more than one node, as this leads to corruption of data in the volume. Thus, while a conventional SAN consolidates storage resources into a single array and offers advantages over previous approaches using directly attached storage (DAS), it does not provide data sharing mechanisms between storage volumes in the SAN.

However, there exists an increasing need for data generated on one node to be accessible by another node. Network file systems (NFS) offer a means to achieve such a transfer. Such systems involve the retrieval of data from a first volume of the SAN by a first node, transmission of the data over a local area network (LAN) such as an Ethernet or Gigabit Ethernet to a second node, and storage of the data in a second volume of the SAN by the second node. Such a transfer path for data leads to duplication of data in the SAN and thus wasted disk space, and causes increased load or traffic on the LAN. Such transfers further require a significant amount of time, particularly in the case of data intensive operations shared over a plurality of computers, such as post production of film, television or advertisements, satellite stream acquisition, media broadcasts, and meteorological applications. Indeed, the LAN can be overloaded by such transfers and become a bottleneck to the data transfer, and thus further delay the tasks to be performed by each node in respect of the data being transferred. Other techniques include CIFS and FTP transfers, which suffer from similar disadvantages.

A shared file system is a concept that allows many computers to access a single file system and treat it as if it were local. Attempts have been made to implement an effective shared file system, however most such attempts to date have been limited to very specific storage architectures, homogeneous computer architecture, and the same operating system on all computers. Thus, such solutions necessitate a significant capital outlay to ensure such hardware and architecture requirements are met, and do not allow use of heterogeneous equipment which may already be in place.

In very recent times, a shared file system interoperable with heterogeneous hardware and operating systems has been developed by Silicon Graphics, Inc under the name CXFS. The CXFS system, set out in US Patent Application Publication No. US2003/0078946, the contents of which are incorporated herein by reference, is able to accommodate all major operating systems such as SGI®, IRIX®, Linux®, Microsoft® Windows®, Apple® Mac OS® X, Sun Microsystems Solaris®, and IBM® AIX®. CXFS allows direct access to the SAN from all the connected nodes and maintains data coherency by leasing out tokens for various actions. For instance, read/write tokens exist for access to individual files and tokens exist for allocating new disk block extents. One of the nodes serves as a CXFS metadata server for each file system and controls granting and replication of tokens. Relocation recovery of metadata servers is supported in CXFS, should the metadata server node become disconnected, with or without warning.

Further, reliable data rate access to storage is needed by many applications, such as broadcast, multicast and editing of digital media files, and sensor data collection and processing. Many ways of providing guaranteed rate data access have been proposed and implemented including Guaranteed Rate I/O (GRIO) disk bandwidth scheduler, available from Silicon Graphics, Inc. (SGI) of Mountain View, Calif. In conjunction with the XLV disk volume manager, also available from SGI, guaranteed disk bandwidth reservations are provided by GRIO at the local client level, to DAS. Bandwidth reservations can be attached to individual files or entire file systems and can be shared between processes. The local DAS must be configured appropriately to support GRIO. If the data rate required by an application is greater than can be provided by a single disk, the disk must be in a volume with the data striped across several disks or staggered to multiple disks so that different processes can access different disks independently.

GRIO is an integral part of the local I/O system in IRIX® (SGI's version of UNIX) to ensure that guaranteed rate access can be guaranteed. GRIO uses a frame-based disk block scheduler without reordering requests and maintains a database of the different pieces of hardware in the system and their performance characteristics. When a request for a bandwidth reservation is received from a process executing on the local client node, determinations of available bandwidth are made for components along the entire physical I/O path, starting with the I/O adapter accessed by multiple processors and ending with the local data storage, and including the storage devices, SCSI and Fibre Channel buses, system interconnects and bridges. The total reservations for all processes at each component along the path is kept below the total available bandwidth for that component. If this level would be exceeded, the GRIO daemon denies the request. Excess capacity may be used for overband consumption by a process provided the remaining reservations will not be adversely affected during the period of the overband request.

To date GRIO is available only for individual client nodes accessing directly attached storage (DAS), and no known client software solutions provide guaranteed rate access to a shared file system shared by a cluster of nodes via a storage area network (SAN). The closest known solution is to copy files stored on a SAN to local storage at a particular node and use GRIO to control synchronization of accesses to the files in local storage. This technique is adequate for some uses, such as non-linear editing; but is less than desirable for large-scale on-demand multicasting of video files, for example, due to the large amount of extra local storage that would be required and would not be needed if guaranteed rate access to the resources of the SAN were supported.

There are several benefits of SANs that are not obtained by the solution described above. Fault tolerance for accesses to the data is one of the primary benefits of a SAN. In addition, load balancing and enabling heterogeneous client access to the same physical storage are also benefits that can be obtained by a shared file system using a SAN.

Unless otherwise specified, the term GRIO in the following makes reference to an improved system for guaranteed rate I/O access for processes to a file storage, and not to the guaranteed rate I/O solution discussed in the preceding paragraphs.

SUMMARY OF THE PRESENT INVENTION

A method for controlling utilisation of a file storage by a plurality of processes. The method comprises establishing a controller daemon and empirically determining a qualified bandwidth of the file storage. The controller daemon maintains a record of existing bandwidth reservations, and receives a request for a bandwidth reservation for access to the file storage by a process. The controller daemon determines whether granting the request would result in a sum of bandwidth reservations which exceeds the qualified bandwidth. Provided the qualified bandwidth would not be exceeded by granting the request, the controller daemon grants the request for bandwidth reservation.

BRIEF DESCRIPTION OF THE DRAWINGS

Exemplary embodiments will now be described with reference to the accompanying drawings in which.

DETAILED DESCRIPTION OF EXEMPLARY EMBODIMENTS

A method for controlling utilisation of file storage by a plurality of processes in an exemplary embodiment comprises empirically determining a qualified bandwidth of the file storage and establishing a controller daemon. The controller daemon maintains a record of existing bandwidth reservations, and receives a request for a bandwidth reservation for access to the file storage by a process. The controller daemon determines whether granting the request would result in a sum of bandwidth reservations which exceeds the qualified bandwidth, and provided the qualified bandwidth would not be exceeded by granting the request, the controller daemon grants the request for bandwidth reservation.

The exemplary embodiment may be implemented in a SAN servicing a cluster of computing systems each running UNIX or IRIX® and a shared file system, such as CXFS and volume manager XVM, both from SGI. Additional details of such an operating environment are provided in US Patent Application Publication No. US 2003/0078946 by Costello et al., and "Messaging Between Heterogeneous Clients Of A Storage Area Network" by Cruciani et al. and "Multi-Class Heterogeneous Clients In A Clustered File System" by Moore et al., both filed Apr. 16, 2003, and the contents of each of these documents are incorporated herein by reference.

Figure 1:
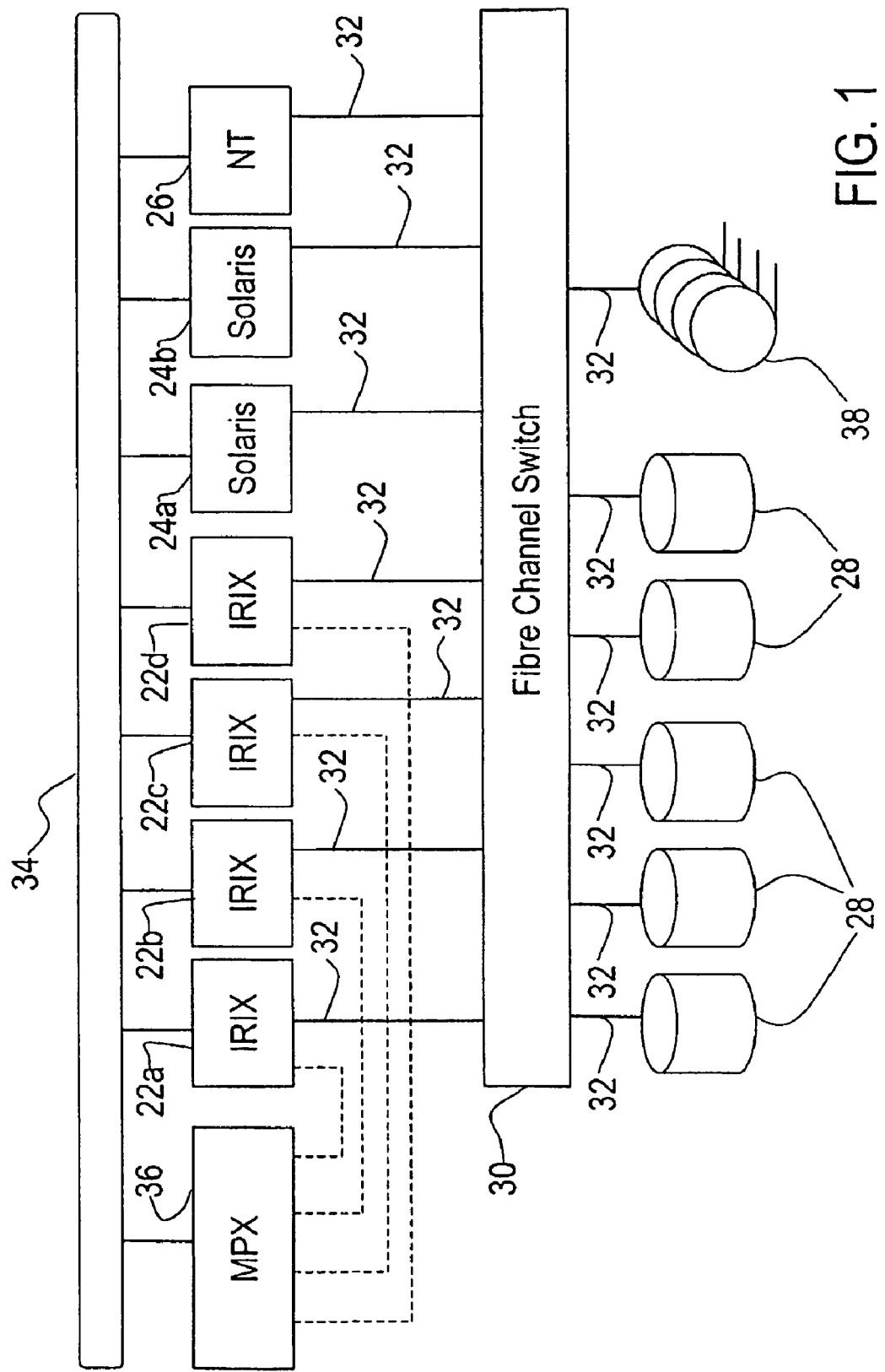
FIG. 1 illustrates a shared file system in which the present embodiment is implemented.

An example of such a cluster is illustrated in FIG. 1. In the example illustrated in FIG. 1, nodes 22 run the IRIX® operating system from SGI while nodes 24 run the Solaris™ operating system from Sun Microsystems, Inc. of Santa Clara, Calif. and node 26 runs the Windows® NT® operating system from Microsoft Corporation of Redmond Wash. Each of these nodes is a conventional computer system including at least one, and in many cases several processors, local or primary memory, some of which is used as a disk cache, input/output (I/O) interfaces, and I/O devices, such as one or more displays or printers. In the exemplary embodiment, the cluster includes a storage area network in which mass or secondary storage, such as disk drives 28 are connected to nodes 22, 24, 26 via Fibre Channel switch 30 and Fibre Channel connections 32. The nodes 22, 24, 26 are also connected via a local area network (LAN) 34, such as an Ethernet, using TCP/IP to provide messaging and heartbeat signals. A serial port multiplexer 36 may also connected to the LAN and to a serial port of each node to enable hardware reset of the node. In the exemplary embodiment illustrated in FIG. 1, only IRIX® nodes 22 are connected to serial port multiplexer 36.

Other kinds of storage devices besides disk drives 28 may be connected to the Fibre Channel switch 30 via Fibre Channel connections 32. Tape drives 38 are illustrated in FIG. 1, but other conventional storage devices may also be connected. Additionally or alternatively, disk drives 28 or tape drives 38 (or other storage devices) may be connected as directly attached storage (DAS) to one or more of nodes 22, 24, 26, e.g., via SCSI connections (not shown).

One use for a cluster of the type illustrated in FIG. 1 is a video broadcast studio in which video clips are stored in files on disk drives 28 (or tape drives 38). Non-linear video editors running on heterogeneous nodes 22, 24, 26 modify the video files while the files are accessible for broadcasting on television. A cluster aware guaranteed rate scheduler according to the exemplary embodiment ensures that the bandwidth requirements of the playback servers are met with an acceptable level of quality of service (QoS).

CXFS allows direct access to the SAN 28, 30, 32 from all the connected clients 22, 24, 26 and maintains coherency by leasing out tokens for various actions. For instance, read/write tokens exist for access to individual files and tokens exist for allocating new disk block extents. One of the nodes 22 serves as a metadata server for each file system and controls granting and replication of tokens. Relocation recovery of metadata servers is supported in CXFS.

As such a file system provides for direct I/O by a process once it has been granted permission, the exemplary embodiment provides a guaranteed rate I/O (GRIO) service to a shared file system. Such embodiments bring the workflow advantages of a shared file system, such as zero copy workflow and efficient direct to disk DMA file I/O, along with satisfying requirements for deterministic I/O performance. Thus the exemplary embodiment enables both such requirements to be met from a single pool of shared storage.

The exemplary embodiment of the file storage system and method extends deterministic file system performance to the cluster environment shown in FIG. 1. The exemplary embodiment requires little or no user-space code on client nodes. By centralising all GRIO reservation and scheduling logic on a unique GRIO server node running a unique controller daemon ggd2, and forwarding GRIO commands using the existing reliable CXFS kernel RPC infrastructure, the present embodiment avoids the need for a client side daemon. The GRIO server node may be the same node as CXFS server node 22, or may be a different node in the cluster. The GRIO server node can be relocated within the cluster automatically or by administrator command. Should the GRIO server node also have local file volumes on DAS, the controller daemon ggd2 serves the dual purpose of managing the local volume domain for that node alone, and also manages the shared file volume domain.

By making bandwidth reservations with reference to the qualified bandwidth of the file storage, the exemplary embodiment operates to prevent oversubscription of the file storage. The phrase qualified bandwidth is defined herein to relate to the maximum bandwidth that can be delivered by a file system (and the volume on which it resides) in a given configuration under a realistic application workload such that all applications are delivered an adequate quality of service. That is, the qualified bandwidth is a measure of the maximum bandwidth that can be sustained to or from a filesystem volume as a whole without oversubscribing the underlying storage resource during a period of maximum cluster activity.

Use of such a measure of qualified bandwidth avoids the need to assess the bandwidth capabilities throughout the file storage, for example at all nodes or leaves of the file storage, and further avoids the need to determine and record component performance for all hardware components making up the file storage.

Thus, the exemplary embodiment treats a file volume as a virtual device and schedules I/O to the volume as a whole, and does not schedule I/O to a raw device. The exemplary embodiment schedules I/O at the head of the volume, on entry to the volume manager.

By using the qualified bandwidth measure, the exemplary embodiment allows application-specific work flow issues and quality of service requirements to be adaptively managed. While basic hardware bandwidth capabilities of the file storage 28, 30, 32 provide a basis for estimating a suitable qualified bandwidth, the qualified bandwidth measure can adapt to characteristics of user applications, such as an application having large tunable buffers, for example an application that carries out aggressive RAM caching. Such an application can tolerate a greater variation in I/O service time than, for example, a media broadcast system which must cue and play a sequence of very short clips. For the former type of workload the qualified bandwidth can be configured as a larger proportion of the sustained maximum, while for the latter type of workload the qualified bandwidth can be reduced to improve I/O service times, while reducing system utilisation levels.

Figure 2:
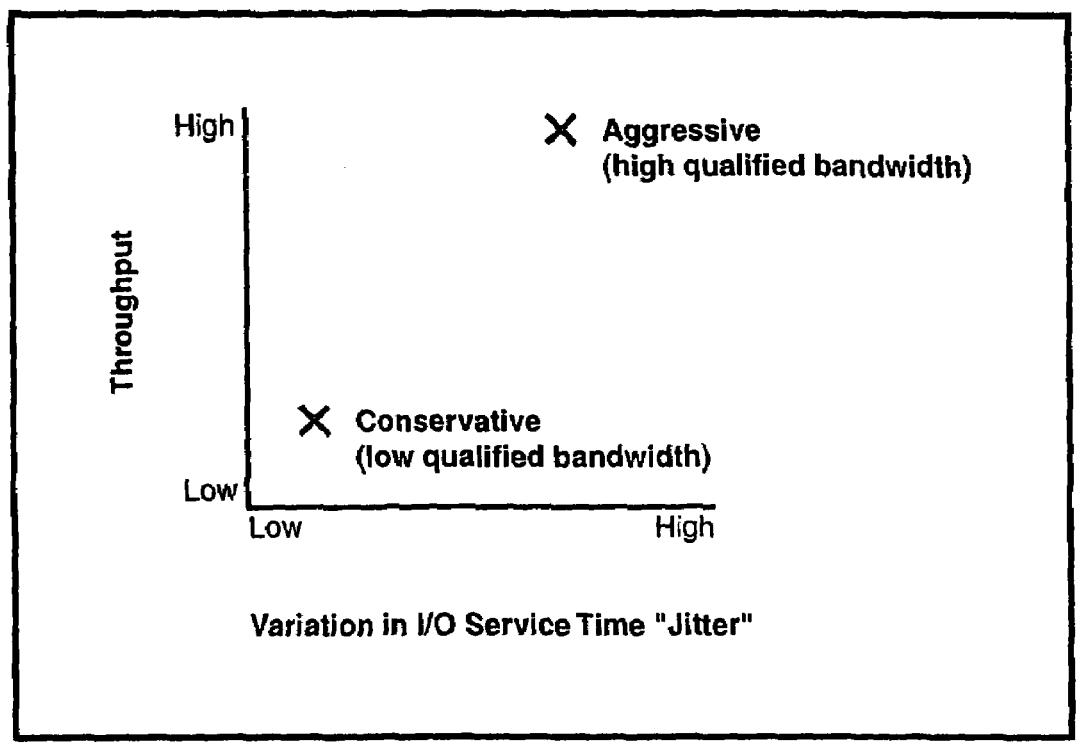
FIG. 2 illustrates the trade off between throughput and jitter in selecting the qualified bandwidth.

A high qualified bandwidth will generally achieve the greatest throughput of the file storage 28, 30, 32, but with the trade off that individual applications may intermittently experience longer service times for some I/Os. Such a variation in I/O service time is referred to herein as jitter. As the throughput of file storage 28, 30, 32 approaches saturation, jitter will typically increase. On the other hand, a relatively low qualified bandwidth reduces total throughput, but with the result of improving (reducing) jitter for individual requests. FIG. 2 illustrates the trade off involved between throughput and jitter, with a high qualified bandwidth being associated with a high jitter and high throughput, while a low qualified bandwidth is associated with low jitter and low throughput. The actual balance of this trade off is highly dependent on the actual storage hardware 28, 30, 32. Some storage devices, particularly those with real time schedulers, can provide a fixed bound on I/O service time even at utilisation levels close to their maximum, in which case the qualified bandwidth can be set higher even when user applications have tight quality of service requirements. Being administrator-adjustable, the qualified bandwidth provides flexibility for the GRIO managed system of the exemplary embodiment to be applied in a versatile range of applications. Jitter may be deemed more acceptable should I/O buffering be implemented by GRIO applications of the cluster.

Use of the qualified bandwidth measure further makes the method of the exemplary embodiment scalable with changes or additions to the underlying hardware used to build the file storage, as the qualified bandwidth of the file storage can be empirically redetermined upon an update in hardware. Similarly, re-configured volume management can be accommodated.

Thus, using the measure of qualified bandwidth provides for significantly simplified scheduling logic, enables kernel code changes to be localised, thus improving cross-platform portability, and decouples the controller daemon from specific characteristics of any given file storage, file volume, or volume manager. Furthermore, configurability of the qualified bandwidth enables an administrator to control the trade off between resource utilisation and delivered I/O performance and QoS. Thus the administrator is provided with the ability to establish the maximum qualified system bandwidth which meets their quality of service requirements. As each system may have unique components and unique demands upon it, such administrator control is particularly advantageous.

The exemplary embodiment recognises that depending on application design, for example whether an application uses asynchronous I/O, threading or buffering, each application will have a different sensitivity to I/O jitter. Such sensitivities span a whole spectrum from zero tolerance, where a fixed bound on service time is required (traditional real-time), to greater tolerance where a guaranteed sustained bandwidth over a significantly longer interval will suffice (for instance where an application utilises large in-memory buffers). The qualified bandwidth of the exemplary embodiment may be tuned to meet system demands which fall anywhere within such a spectrum of I/O QoS requirements.

In the exemplary embodiment, the qualified bandwidth is determined by setting the qualified bandwidth to an initial value and applying a test workload equal to the initial value to the file storage. The delivered I/O performance is monitored, and the qualified bandwidth is modified in response to the delivered I/O performance. Guidance as to an appropriate initial value of the qualified bandwidth can be obtained by taking the initial value to be a fraction of storage device bandwidth parameters obtained from RAIDs, bus and disk performance, and number of HBAs.

In alternate embodiments, the qualified bandwidth may be determined by applying a test workload equal to the qualified bandwidth and determining whether quality of service requirements are met by a present value of the qualified bandwidth and, provided quality of service requirements are met, increasing the qualified bandwidth to maximise throughput of the file storage. Such a process may be repeated iteratively to determine a maximum value of qualified bandwidth for which the quality of service requirements continue to be met.

The exemplary embodiment further provides kernel instrumentation and metrics, enabling QoS to be closely assessed in respect of an actual workflow applied to the file system. In the exemplary embodiment such instrumentation tracks every top level buffer (corresponding directly to a read or write system call) as it is serviced, and records the length of time taken to complete each I/O. Each such measured service time is entered into a kernel histogram to record the distribution of individual I/O service times. The exemplary embodiment further provides an interface to export such histograms to userspace, where they can be sampled periodically. By monitoring the changes, the I/O service time response for a given stream can be monitored as the workload progresses. By providing such instrumentation for every stream, including non-GRIO streams (such as dynamically and statically allocated streams) a measurement of performance for the entire cluster can be obtained.

The exemplary embodiment further provides metrics to capture temporal characteristics of the I/O service times, recognising that I/O service time histograms alone do not give an adequate indication of the temporal sequencing of individual service times. For instance, one such histogram may be bi-modal, with a large count of long I/O service times and a large count of short I/O service times. From such a histogram it is not possible to tell whether long I/O service times occur closely together, leading to violation of a required data rate, or whether such long I/O service times only occur in isolation, and do not lead to a violation of the required average data rate. Thus, the exemplary embodiment provides instrumentation indicating temporal characteristics of the I/O service times, for example as set out below in Table 1.

TABLE 1

Sample temporal I/O performance metrics for a 4 MB per I/O single-threaded unthrottled writer with a 40 MB/s GRIOv2 reservation to a moderately loaded storage system

| Sample Interval | Min bw (MB/s) | Max bw (MB/s) | Last bw (MB/s) | Min I/O (ms) | Max I/O (ms) | Last I/O (ms) |
| --- | --- | --- | --- | --- | --- | --- |
| 1 I/O   |       |       |       | 47.9 | 122.5 | 117   |
| 2 I/O   | 32.58 | 83.14 | 34.08 | 48.1 | 117.5 | 115.5 |
| 3 I/O   | 33.96 | 82.83 | 34.55 | 49.7 | 113.7 | 95.8  |
| 4 I/O   | 35.1  | 80    | 41.59 | 49.3 | 110.4 | 97.7  |
| 5 I/O   | 36.16 | 80.76 | 40.83 | 49.2 | 107.6 | 101   |
| 6 I/O   | 37.05 | 80.92 | 39.47 | 49.9 | 105.5 | 103.1 |
| 10 I/O  | 38.8  | 79.66 | 40.19 | 49.8 | 102.3 | 100.6 |
| 100 ms  | 32.58 | 79.99 | 34.08 | 49.3 | 117.5 | 115.5 |
| 200 ms  | 33.96 | 80.92 | 34.55 | 49.9 | 113.7 | 95.8  |
| 500 ms  | 37.05 | 79.86 | 39.47 | 50   | 105.5 | 103.1 |
| 1000 ms | 38.97 | 78.63 | 39.66 | 50.6 | 101.7 | 96.4  |
| 2000 ms | 39.95 | 77.98 | 40.83 | 51   | 99.6  | 98.4  |
| 5000 ms | 40.58 | 55.93 | 41.06 | 71   | 98.3  | 97.5  |
| 150 I/O | 40.85 | 41.12 | 41.04 | 84.4 | 97.6  | 97.2  |

As seen in Table 1, the exemplary embodiment determines metrics for sample intervals varying from a single I/O (corresponding to individual I/O service time), up to a configurable maximum number of samples (in Table 1 150 I/Os, for example), and for sample time intervals varying from 100 ms up to a limit of recorded samples (5000 ms). The metrics determined for each such sample interval include: the minimum bandwidth in MB/s for that interval; the maximum bandwidth in MB/s for that interval; the last or most recent average bandwidth in MB/s; the minimum I/O service time in ms; the maximum I/O service time in ms; and the last or most recent average service time in ms.

Accordingly, the exemplary embodiment provides detailed indications of the best, worst and recent average bandwidth and service times, for a range of different sampling intervals, thus allowing a user to see the min/max bandwidths and I/O service time since the stream was created or the counters reset. As such performance metrics are provided for a whole range of possible sampling intervals, and encompass all I/O streams in the shared file system whether GRIO or non-GRIO, the exemplary embodiment enables the user or system administrator to select a sampling interval that best matches their application requirements and determine whether under the given workload their specific QoS requirements are met.

Table 1 further illustrates the amount of hardware over-provisioning required should a simplistic QoS measure such as maximum service time for a single I/O be applied. As can be seen, in the above example the average maximum I/O service is 20% greater than the average maximum service time when the sample interval is 10 I/Os. Thus, provisioning storage hardware to minimise the delay observed for any single I/O leads to a more expensive solution. Indeed the observed difference can be much greater when the storage system is more heavily loaded, or employs low-level firmware and scheduling logic less suited to guaranteed rate applications. To the contrary the exemplary embodiment recognises that some applications tolerate some I/O delay, and that a given storage system may thus be able to be driven at a higher utilisation level with appropriate definition of the qualified bandwidth.

In order to compute the above metrics a history of I/O service times is maintained. Due to the high rate of I/Os performed in high performance file systems, and in order to support auto-reservation streams (described below) which come into existence without the knowledge of the application and without any involvement of userspace libraries or other hooks in userspace, the history of service times is stored in the kernel. A data reduction step is recomputed at every I/O. As the kernel is resident in memory at all times, in the exemplary embodiment the storage of such I/O service time history and the calculation of the data reduction step are space efficient and computationally efficient. Accordingly, the exemplary embodiment maintains a buffer of recent I/O service times which allows computation of moving averages over each sampling interval. The minimum, maximum, and instantaneous values of these moving averages are stored in a collection of structures, one for each monitored sampling interval.

The moving average is a box filter that slides across the raw data. At each sample point Si the monitored metric (eg. delivered bandwidth, or average service time) is computed for the interval [Si, Si+width] where width can be expressed in time or sample count. The resulting values yield the moving average, and the best and worst observed bandwidth across any interval of the given length during the observation period. A sample interval of length one tracks IO service time. A very large interval provides the recent sustained bandwidth of the stream. By computing such metrics for these and a range of intermediate values, the exemplary embodiment allows a user application to analyse the trade off between IO jitter (variation in IO service times) and sustainable bandwidth.

For each I/O stream a ring buffer is maintained of recent I/O sample times (being the interval between the time at which the buffer is received and the time at which the storage device returns the data). In the exemplary embodiment the size of the ring buffer and the number of different sampling intervals that are monitored is configurable. In addition to the buffer of samples a head pointer into the array is maintained, along with a configurable number of tail pointers. Each tail pointer is maintained at a specific distance from the head, that distance being measured in either samples (buffer entries), or time. For each I/O the head pointer is moved along and the new sample inserted into the buffer. Each tail pointer is also moved along the buffer depending on their type. As each pointer is moved, the corresponding metrics for that interval are recomputed and updated. The buffer data is incremented as the head pointer is advanced, and decremented as each tail pointer advances.

In the exemplary embodiment, such a function is carried out when every top-level I/O is completed, or when any buffer is issued to a non-GRIO stream. The exemplary embodiment provides interfaces for exporting such information to userspace, and tools for inspecting the metrics. Further, counters can be reset dynamically, and the set of monitored intervals can be reconfigured per stream.

The exemplary embodiment is deployed as a software component operable in the whole range of client operating systems with third party device drivers. Being operable with such heterogeneous operating systems rules out the use of special hooks in any device driver layer. However, the use of the qualified bandwidth measure of the exemplary embodiment allows scheduling of bandwidth allocations to be performed above the volume manager layer. It is further desirable to avoid user space components (daemons) running on client nodes, which would need to be ported and deployed on every supported platform. The exemplary embodiment avoids the need for such userspace components by leveraging the common kernel RPCs and using a single centralised bandwidth management daemon ggd2.

In the exemplary embodiment, the controller daemon ggd2 explicitly manages all user and system I/O to the file system, such that I/O to the file system by any node may not take place without authorisation from the controller daemon ggd2. The controller daemon ggd2 notifies all nodes 22, 24, 26 in the cluster of this management. Thus, user and system I/O resulting from processes which are not operable to make reservation requests for access bandwidth to the file system is nevertheless encapsulated by the management of the controller daemon ggd2. Such I/O is preferably accommodated by the exemplary embodiment associating such I/O with a system managed kernel stream, whereby the controller daemon ggd2 allocates otherwise unused bandwidth for use by such kernel streams. The exemplary embodiment thus enables processes which do not make bandwidth reservation requests to nevertheless be accounted for in the controller daemon ggd2 ensuring that a total file system access load remains below the qualified bandwidth.

In such embodiments, each node 22, 24, 26 of the shared file system, must be operable to receive from the controller daemon ggd2 a bandwidth allocation for a kernel stream. Processes using such kernel stream bandwidth allocations are defined herein to be non-guaranteed rate I/O (non-GRIO) processes. Each node must operate to ensure that accesses to the shared file system by all non-GRIO processes of that node do not exceed the kernel stream bandwidth allocation. Where a node accesses more than one file system, that node must establish one kernel stream for each file system. Where a file system is local to a single node, only one non-GRIO stream will be established in respect of that file system. In the exemplary embodiment, the scheduling for all non-GRIO activity within a given file system received from different applications and system services is on a first-come first-served basis.

Further, while non-GRIO reservations may consume some or much of the qualified bandwidth, non-GRIO bandwidth reservations are considered at all times as being available for GRIO reservation, as non-GRIO reservations may be revoked or reduced in a subsequent distributed allocation period, and the bandwidth thus made available may be granted to one or more GRIO reservations. Accordingly, non-GRIO reservations may be considered a bandwidth lease.

The exemplary embodiment further permits each client node 22, 24, 26 to conduct non-GRIO activity below a fall back minimum data rate, even in the absence of an explicit bandwidth allocation. The fall back data rate is the same for all nodes and is nominally small, for example 64 Kb/s. Thus, upon revocation or non-renewal of a non-GRIO bandwidth lease by the controller daemon ggd2, a client node will relinquish the non-GRIO lease and reduce I/O activity to remain within the fall back data rate. In the exemplary embodiment, the system administrator or user may also configure one or more nodes to operate using a static non-GRIO bandwidth allocation. The static non-GRIO bandwidth allocation of each node may be configured by the administrator to correspond with an intended use of that node. As the static bandwidth allocation is explicitly user managed, each node may at any time undertake I/O activity within the static bandwidth allocation without requiring involvement of the controller daemon ggd2.

Depending on the desired configuration, the controller daemon ggd2 may dynamically allocate non-GRIO bandwidth to a node in addition to the static bandwidth allocation of a given node, or alternatively dynamic bandwidth allocations to that node may be disabled for that node-volume pair.

Figure 3:
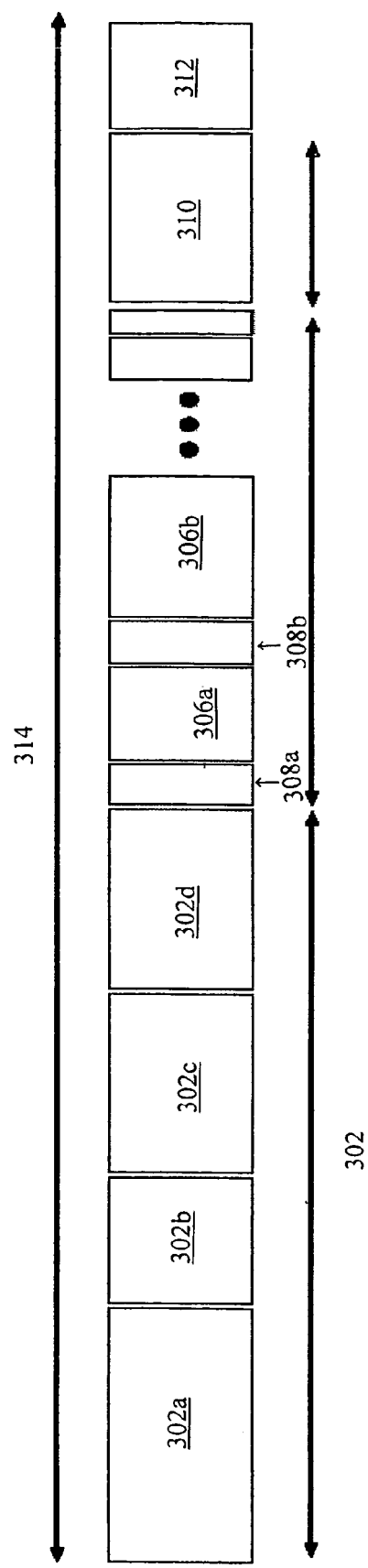
FIG. 3 illustrates an encapsulated qualified bandwidth allocation managed by a controller daemon.

FIG. 3 illustrates an encapsulated qualified bandwidth schedule 300 administered by the controller daemon ggd2 comprising explicit GRIO reservations 302, non-GRIO allocations 304 including dynamic non-GRIO allocations 306 and static non-GRIO allocations 308, reserved or cached bandwidth 310, and free bandwidth 312, which in sum makes up the qualified bandwidth 314. In accordance with the exemplary embodiment, each node 22, 24, 26 must operate all I/O within bounds which are set by the controller daemon ggd2 operating on one of the nodes 22, 24, 26. These bounds are set in response to reservation requests made by each node.

Figure 4:
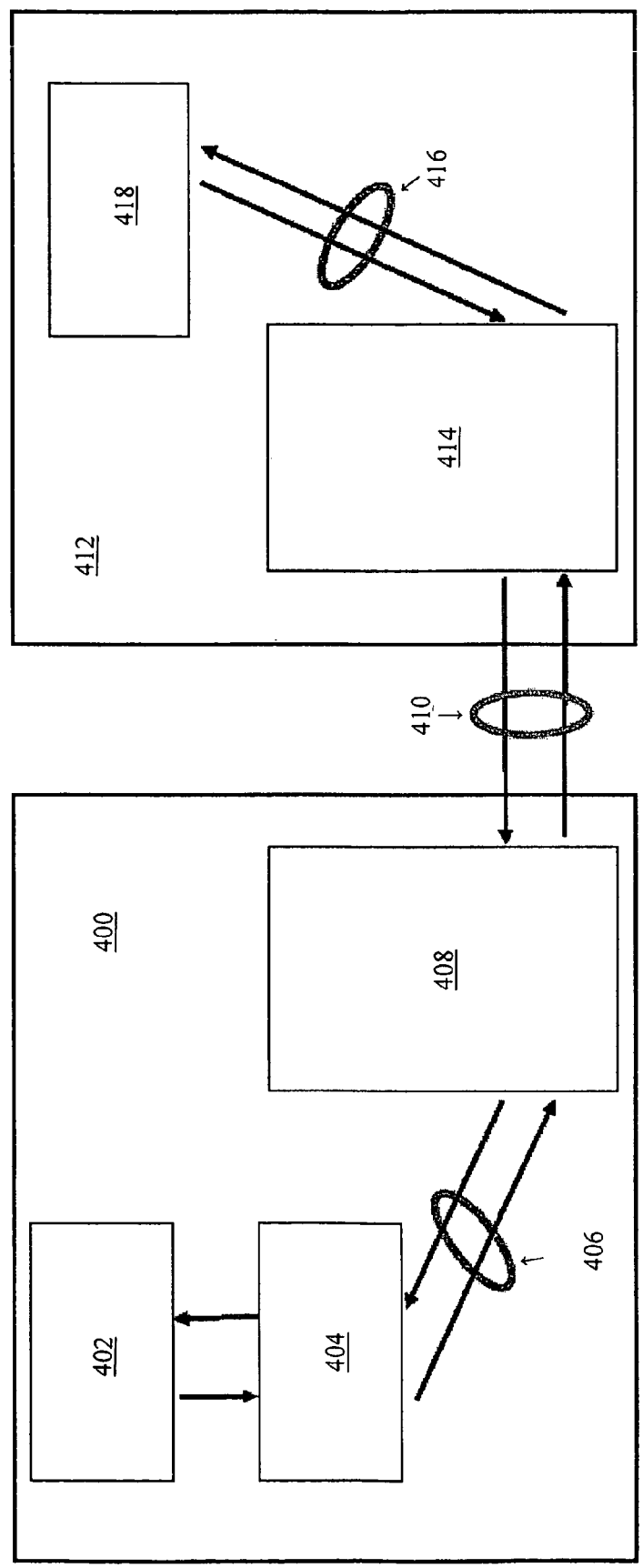
FIG. 4 illustrates a bandwidth reservation request of a GRIO-aware application.

FIG. 4 illustrates the manner in which a reservation request is made by a GRIO-aware process or application in the exemplary embodiment. A reservation request of a GRIO-aware application 402 of a node 400 commences with use of a libgrio2 library 404 to make a system call 406 to the operating system kernel 408 of node 400. The operating system kernel 408 of node 400 makes a kernel remote procedure call (RPC) 410 to the kernel 414 of whichever node is presently operating the controller daemon ggd2 418 (shown as node 412). The operating system kernel 414 of node 412 passes 416 the reservation request to the controller daemon ggd2 418, which queues all such requests and executes them in order. The controller daemon ggd2 418 responds to the kernel 408 of node 400 with a grant or denial of the request.

A granted request is executed by the client kernel 408 of node 400 creating a stream definition corresponding to the bandwidth reservation 302.

Figure 5A:
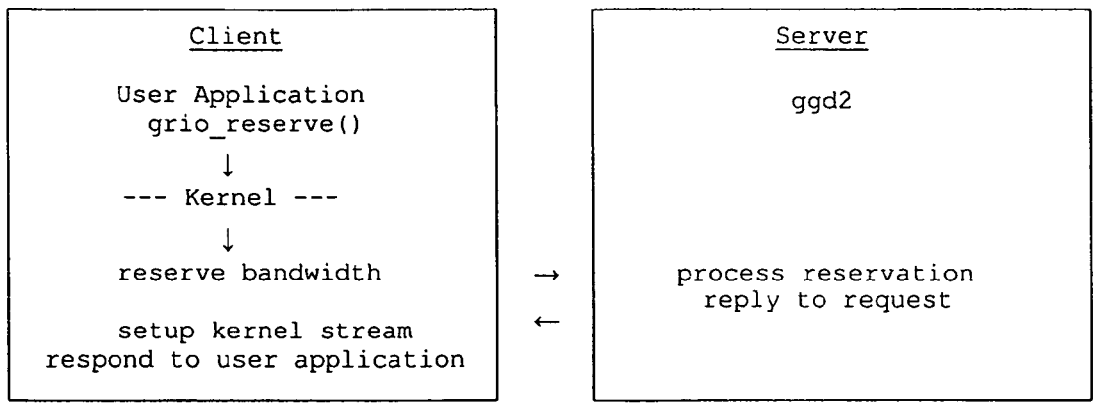
FIGS. 5a to 5c illustrate the location of tasks performed for reserve, I/O and release actions.

FIG. 5 illustrates the interaction between a GRIO-aware user application, a client node kernel and the controller daemon ggd2 on a server node. In FIG. 5a, a bandwidth reservation request is made by the user application making a grio_reserve( ) call to the client node kernel in order to explicitly reserve I/O bandwidth. The client node kernel communicates the bandwidth reservation request to the controller daemon ggd2 of the server node, which processes the request and responds. In the event that the reservation request is granted by the controller daemon ggd2, the kernel of the client node sets up the kernel stream. The kernel of the client node then responds to the user application accordingly.

Figure 5B:
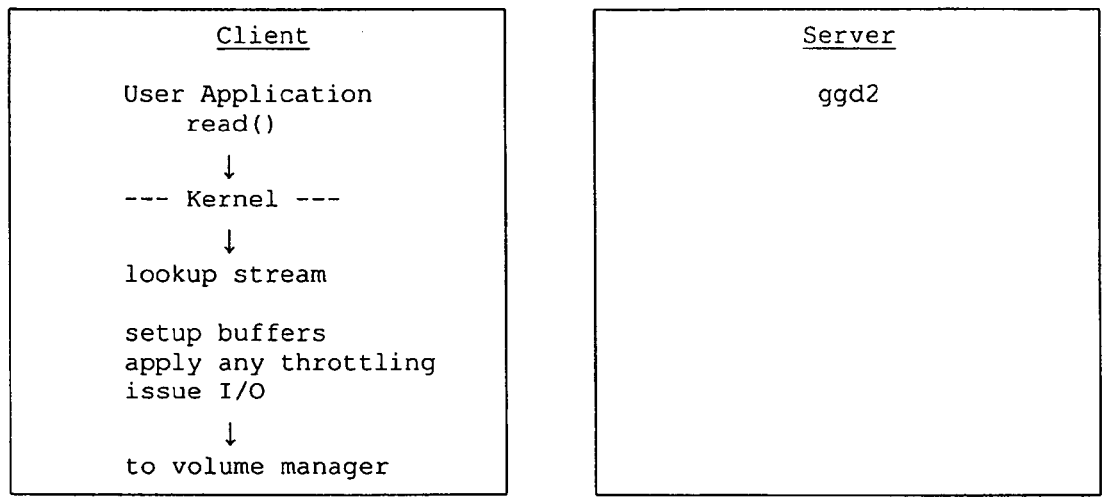

In FIG. 5b, the GRIO-aware user application initiates GRIO I/O activity by making a read( ) call to the client kernel. The client kernel looks up an existing kernel stream relating to that GRIO I/O, sets up buffers, applies any throttling necessary and issues the I/O to the volume manager. Notably, the controller daemon ggd2 is not involved in initiation of GRIO I/O activity where a kernel stream already exists.

Figure 5C:
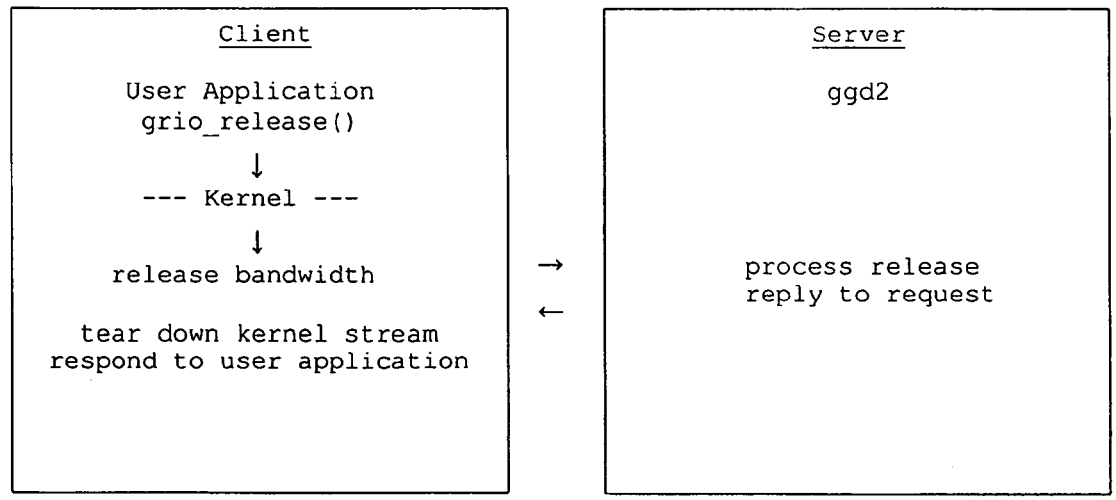

FIG. 5c illustrates release of a GRIO stream by a GRIO-aware application. The user application makes a release( ) call to the kernel of the client node, which communicates a request to release the bandwidth to the controller daemon ggd2. Typically the controller daemon ggd2 will always grant a request to release bandwidth, and simply processes the request so as to update the record 318 of bandwidth allocations accordingly. The controller daemon ggd2 notifies the client kernel upon completion of such processing. The client kernel then deconstructs the kernel stream and responds appropriately to the user application.

By providing a single controller daemon ggd2 on one node, referred to as the server node, the exemplary embodiment enables the controller daemon ggd2 to have a complete view of reservations across all nodes of the cluster, and will be able to detect when a first GRIO stream commences, and/or when a final GRIO stream ceases. Such a configuration further eases development and debugging of the controller daemon ggd2 and reservation schemes. A single controller daemon ggd2 further enables centralised Quality of Service (QoS) monitoring, and centralised storage and retrieval of all QoS information. Further, by requiring all nodes to forward all bandwidth reservation requests to the single controller daemon ggd2, those requests can be serialised and serviced accordingly. The single controller daemon ggd2 further avoids the coordination issues of operating multiple controller daemons for shared volumes, and simplifies failure recovery.

In the exemplary embodiment, only one instance of a controller daemon ggd2 is active for a given volume domain, for example as managed by the SGI XVM volume manager. Thus, only one controller daemon ggd2 is active for the cluster volume domain (ie all of the shared filesystems), operating on a server node. Further, there may also be a controller daemon ggd2 on each of the subset of machines where GRIO is being implemented with DAS. Should there be local volumes on the server node then in the exemplary embodiment the controller daemon ggd2 running on that server node manages both the cluster volume domain, and its local volume domain.

Where the exemplary embodiment operates in a cluster with protected storage, there is preferably a first controller daemon ggd2 operating on the server node which manages the cluster volume, and preferably a second controller daemon ggd2 running independently on the client with the protected storage to manage that storage.

In exemplary embodiments of the invention, other instances of a controller daemon ggd2 exist on other server-capable nodes within the cluster. In such embodiments, these instances are dormant and are only activated by the kernel should a recovery or relocation event take place. When a new controller daemon ggd2 is activated, the current state is uploaded to that daemon. Accordingly, the controller daemon ggd2 of the exemplary embodiment may operate as a cluster GRIO server; a local server managing DAS; or may be dormant awaiting activation by the kernel if required.

Figure 6:
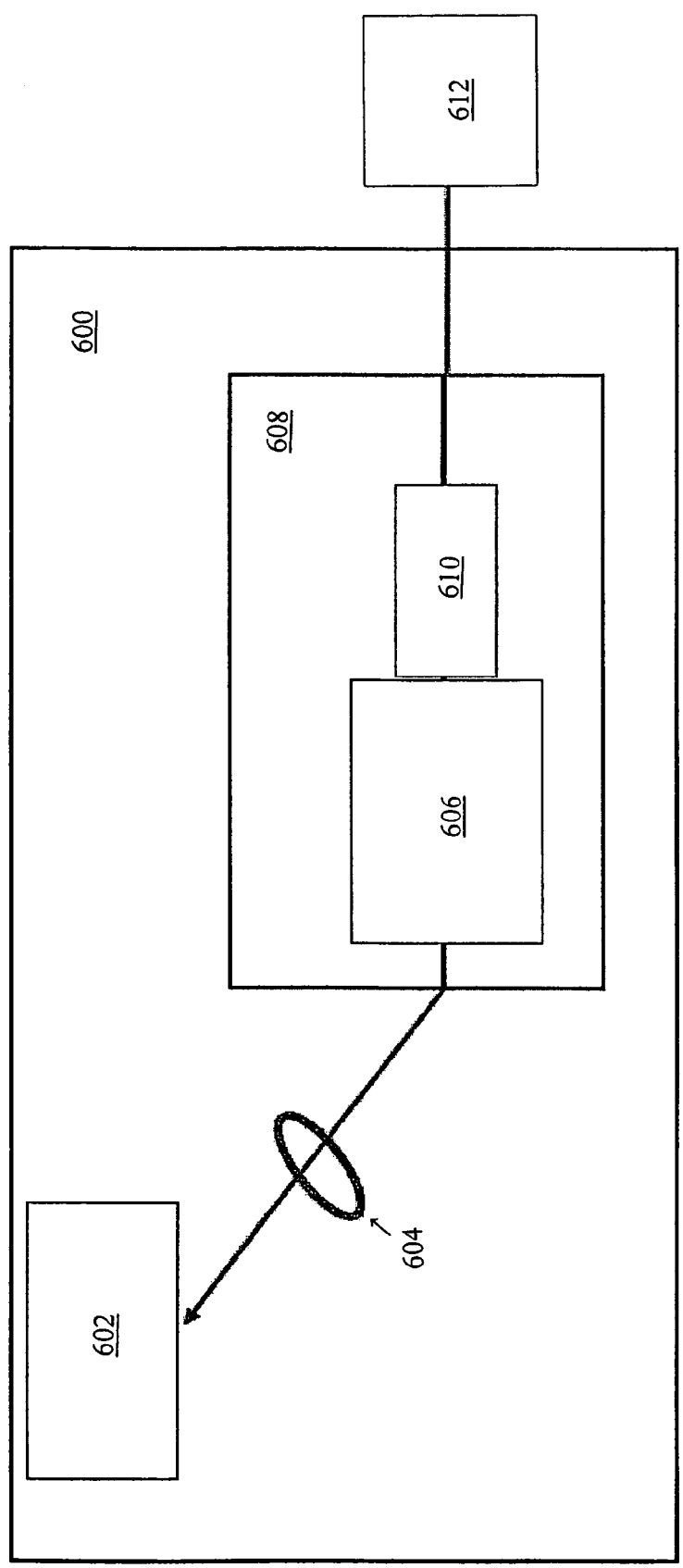
FIG. 6 illustrates utilisation of an explicit bandwidth reservation by a GRIO-aware application of a node.

FIG. 6 illustrates the manner in which node 600 utilises a GRIO bandwidth reservation 606 granted by the controller daemon ggd2. The GRIO-aware application 602 of node 600 issues 604 I/O read/write calls required of the SAN 612. The operating system kernel 608 of node 600 implements the granted bandwidth reservation 606, such implementation including a throttle 610 to ensure that such I/O read/write calls of the GRIO-aware application 602 will not cause the granted bandwidth reservation 606 to be exceeded. Provided such I/O read/write calls are within the bandwidth reservation 606, direct I/O access to the SAN 612 is permitted by the local operating system kernel 608 of node 600, providing the GRIO-aware application 602 of node 600 with guaranteed rate I/O access to the SAN 612, up to the reserved bandwidth. As noted, the local or client kernel 608 throttles access to ensure that the node 600 does not exceed the allocated bandwidth of that node. In the exemplary embodiment the local kernel 608 throttles access by implementing a bounded token bucket rate controller which accumulates I/O "credits" up to a configurable limit using a clock-driven scheme, such that I/O cannot be performed without sufficient I/O credit. Should I/O credit accumulate faster than it is used, the exemplary embodiment permits the I/O to be accelerated to consume such I/O credit.

Figure 7A:
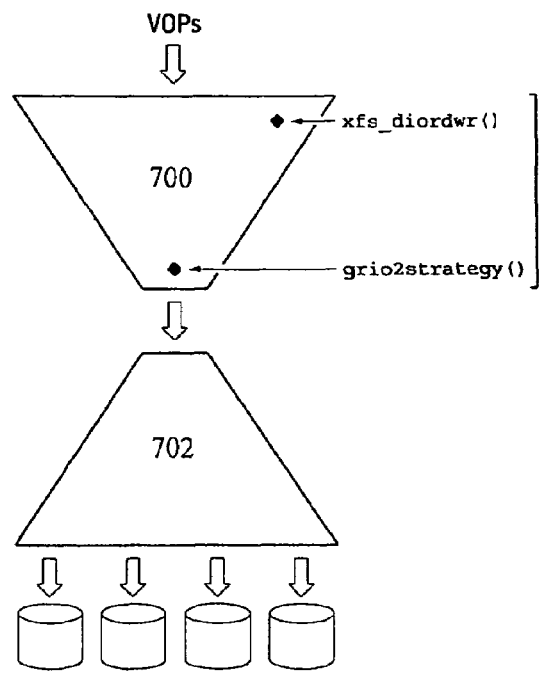
FIGS. 7a to 7c illustrate the position of the GRIO system between the filesystem and the volume manager.
Figure 7B:
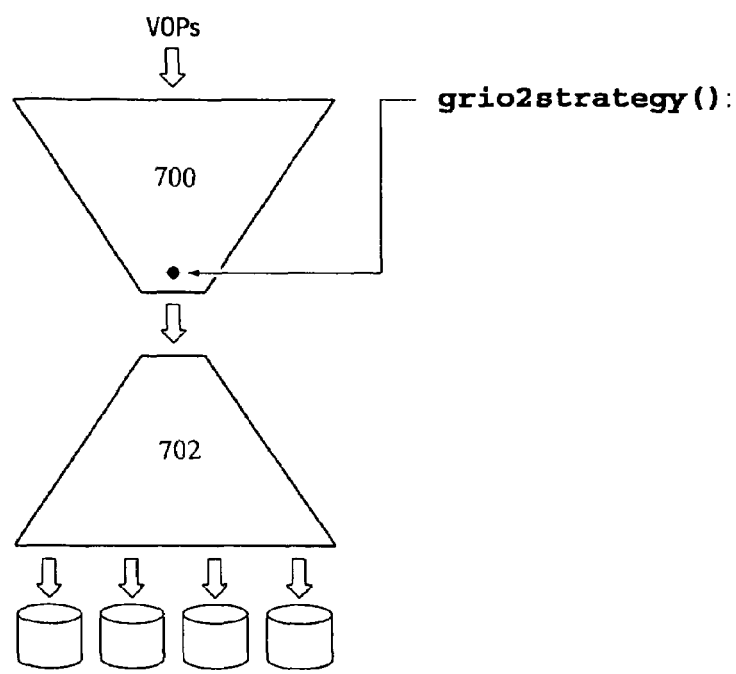
Figure 7C:
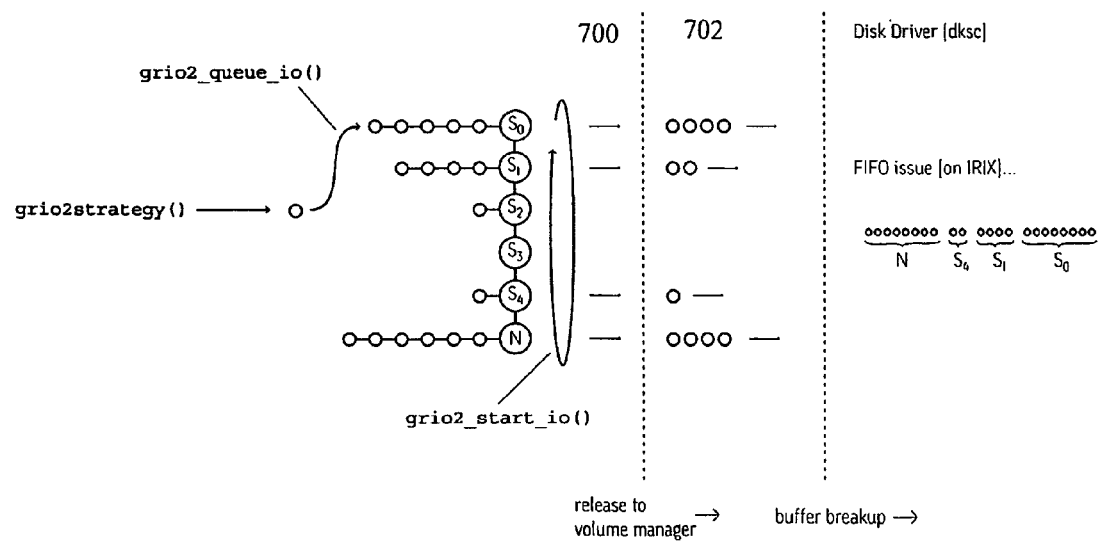

FIGS. 7a to 7c illustrate the manner in which the GRIO system of the exemplary embodiment exists separate to the volume manager. FIG. 7a shows the two points at which the GRIO system of the exemplary embodiment hooks into the I/O path of a file system 700, which in the exemplary embodiment is the XFS or CXFS file system of Silicon Graphics Inc. First, the GRIO system of the exemplary embodiment is involved at the top of the XFS file system when a direct I/O request is received, and secondly at the bottom of the XFS file system just before the I/O is issued to the volume manager 702. In the exemplary embodiment the volume manager 702 is the XVM volume manager of Silicon Graphics Inc.

FIG. 7b illustrates the application of the GRIO strategy at the bottom of the XFS file system 700, grio2strategy( ) being the function entry point to the GRIO scheduler. Three steps take place, first it is determined whether the I/O is associated with a GRIO stream, or, if the I/O does not have an associated stream, it is attached to the appropriate non-GRIO stream. Secondly, the buffer is established and attached to a corresponding queue. Thirdly, the scheduler is run, which walks the various throttle queues and issues all I/O that is eligible to be issued.

FIG. 7c is a schematic of the scheduler, and also shows how the buffer flows from the filesystem 700 to the volume manager 702 and on to the device driver. The flow of a buffer as it is released from XFS is shown. Upon application of grio2strategy( ), the scheduler inserts the buffer onto the appropriate throttle queue, using either a GRIO stream ($S_0$, $S_1$, . . . $S_4$) created by an explicit reservation of the user application, or the non-GRIO stream N. The buffer remains in that queue until the scheduler grio2_start_io( ) is called, which walks through the active streams in round-robin order (always starting with the first) updating the token bucket for each stream based on the current wall clock time, and issuing I/O to the volume manager.

In the exemplary embodiment, the disk driver comprises an IRIX disk driver. On IRIX when the GRIO system of the exemplary embodiment is enabled all I/O is tagged as priority I/O which has the effect of causing the disk driver to issue the I/O in first-in, first-out (FIFO) order, such that the combination of GRIOv2 round-robin traversal, the token buckets, and the disk driver implements a weighted-round robin algorithm. While the ability to influence the driver in this way is possible on IRIX, it may not be available on other platforms. In such embodiments, preferred embodiments disable driver level reordering to increase determinism.

In the exemplary embodiment client nodes 22, 24, 26 elect the GRIO server node using the CXFS election mechanism.

The controller daemon ggd2 is responsible for granting, denying or modifying reservations, tracking reserved bandwidth, allocating stream IDs, aggregating and monitoring QoS performance data across the cluster, and managing unreserved bandwidth. Accordingly, on the shared file system of the exemplary embodiment, bandwidth management runs on the server node only, with all GRIO requests to the shared file system, whether originating from the server node or from client nodes, being processed by the single controller daemon ggd2 operating on the server node. In the exemplary embodiment, the GRIO requests take the form of command structures, which are arranged into a single queue of submitted commands of the entire cluster by the controller daemon ggd2.

In the exemplary embodiment, and as shown in FIG. 5, the controller daemon ggd2 is not responsible for I/O stream creation, but merely for granting or denying reservation requests, with the kernel of the requesting node to which the reservation has been granted being responsible for I/O stream creation once the reservation request has been granted by the controller daemon ggd2. That is, the originating kernel is responsible for building the stream definition, associating it with the file descriptor, adding it to the kernel-wide hash table and caching it for reuse if necessary. Further, as shown in FIGS. 5 to 7, the kernel of each client node is responsible for 'scheduling' all I/O activity of that node, and ensuring that the total I/O activity of all processes of that node do not exceed the bandwidth allocation granted to the node. In the exemplary embodiment, an explicit reservation made by a GRIO-aware application is used by a node to read or write a file using direct I/O requests. The kernel of each node must further provide cluster integration and messaging facilities.

Information describing currently active GRIO reservations is stored both within the controller daemon ggd2 and in the kernels of each client node accessing the GRIO managed filesystem. Thus, the present embodiment enables such information to be recovered from one or more of the client nodes should the server node or the controller daemon ggd2 fail. Accordingly, the present reservations may be rebuilt during a dynamic recovery process. In the exemplary embodiment, a dynamic recovery process is implemented in the event of the controller daemon failing or being disconnected from the cluster. The dynamic recovery process comprises the remaining nodes of the cluster designating one node which is to establish a new controller daemon at that node. Further, the dynamic recovery process comprises each remaining node of the cluster advising the new controller daemon of existing bandwidth reservations of which each remaining node is aware, including GRIO reservations, dynamic non-GRIO reservations and static non-GRIO reservations, in respect of both local and shared file systems to which each node is connected. From such node-specific reservation information, the new controller daemon is able to establish a new record of existing bandwidth reservations for a given file system.

The exemplary embodiment enables existing bandwidth reservations of each node to continue to be used by that node throughout the dynamic recovery process. Designation of a node to establish a new controller daemon at that node is preferably carried out by a server relocation protocol of the type set out in United States Patent Publication No. 2003/0078946, the contents of which are incorporated herein by reference.

The exemplary embodiment further provides for automatic reservation requests, such that upon a GRIO-unaware process initiating an attempt to access a file of a recognised type stored on the shared file system, the local kernel associates the recognised file type with a required bandwidth for that access, and initiates an appropriate request for an explicit bandwidth reservation 304 to the controller daemon ggd2. Thus, in the exemplary embodiment GRIO-unaware processes are nevertheless provided with guaranteed rate I/O whenever accessing a file type which is recognised and with which an appropriate bandwidth can be associated by the local kernel, despite the GRIO-unaware process not making use of the libgrio2 library for making bandwidth reservations. Further, the exemplary embodiment allows such a GRIO stream to be cached so that a plurality of closely spaced I/O functions to a common area of the file system can reuse an existing cached I/O stream without multiple reservation calls to the controller daemon ggd2. Such auto reservation functionality may be provided directly with a small user application, or implemented automatically, for example by way of a CXFS-client daemon operating on client only nodes in a CXFS managed cluster.

Thus, in the exemplary embodiment, the local kernel of each node is operable to associate a process request to open a particular file type of the shared file system with a corresponding bandwidth requirement, and to initiate a request for an appropriate bandwidth reservation, regardless of whether the initiating process is operable to make such a request. Upon the local daemon being granted such a bandwidth reservation, the process is then provided with guaranteed rate I/O (GRIO) access to the shared file system. Such auto-reservation (file type) to (bandwidth) associations in the local daemon may include:

MPEG2: 12 MB/s
Standard Definition TV: 30 MB/s
High Definition TV: 120-240 MB/s
Digital film (2K): 320 MB/s
Digital Film (4K): 1.3 GB/s Further, as shown in FIG. 3 the exemplary embodiment provides for dynamic allocation of unreserved file system bandwidth 306 between nodes of the cluster for use in servicing non-GRIO processes. Non-GRIO I/O refers to buffered and direct I/O to file descriptors without an associated GRIO stream reservation, that is, normal user I/O for which file system bandwidth has not been reserved. Each node is further allocated a static bandwidth allocation 308, such that, even in the absence of a further periodic allocation of unreserved bandwidth, the node is entitled to continue non-GRIO activity within the static allocation. The static bandwidth allocation 308 is configurable by the controller daemon, and for instance may be specified or altered by an administrator. Thus, the exemplary embodiment explicitly manages such non-GRIO, with a dedicated non-GRIO stream 306, 308 for each node in the cluster. The dynamic bandwidth allocator is provided within controller daemon ggd2. The dynamic bandwidth allocator periodically allocates to one or more nodes unreserved bandwidth for use in non-guaranteed rate file system access. Such dynamic allocations occur at coarse intervals, in the exemplary embodiment at intervals in the range of substantially 1-5 seconds. Each node is required to accommodate all non-guaranteed rate file system access within the allocation 306, 308 of that node.

Further, the periodic dynamic allocation of reservations 306 takes into account individual node usage, wherein the controller daemon ggd2 monitors file storage access activity by each node, and preferentially allocates the unreserved bandwidth to nodes having a high level of access activity.

In the exemplary embodiment, GRIO reservations have priority over non-GRIO reservations, such that upon receiving a request for a GRIO reservation, non-GRIO reservations are reduced or not renewed in a subsequent scheduling period. As such a request for a GRIO reservation may not be granted until a subsequent scheduling period, in the exemplary embodiment requesting processes make such a request in advance to allow for a possible delay in the granting of the request, and then cache or buffer the reservation for future use.

Additionally, the bandwidth allocator 300 comprises a cached bandwidth 310 portion of the qualified bandwidth 314 which is withheld from allocation as non-GRIO bandwidth allocations and is made available for new GRIO reservations 302 only. The bandwidth scheduler may further comprise some amount of free bandwidth 312.

It is incumbent on each node to aggregate non-GRIO for the given file system and associate that non-GRIO with its allocated non-GRIO stream 306, 308. The distributed bandwidth allocator (DBA) runs periodically, in the present embodiment every few seconds, on the GRIO server. The DBA allocates unreserved bandwidth to the non GRIO streams 306 of each node, up to the qualified system bandwidth.

In the exemplary embodiment, Quality of Service (QoS) monitoring tools are used to provide feedback to the distributed allocator to ensure that unreserved bandwidth is allocated to the busiest node. The controller daemon is operable to monitor a quality of service provided to each active I/O stream, thus enabling the controller daemon and/or an administrator of the file storage to optimise the qualified bandwidth measure of the file storage. For each active I/O stream, the controller daemon is operable to monitor detailed performance metrics including the currently allocated bandwidth reservation for the stream, total bytes transferred, worst observed bandwidth over a given period, and the worst observed average I/O service time for a sequence of several I/Os.

The controller daemon ggd2 is in the exemplary embodiment operable to monitor I/O activity of each client node, including GRIO activity and non-GRIO activity. Further, the controller daemon ggd2 is operable to weight allocations of non-GRIO bandwidth to nodes for a distributed scheduling quantum in accordance with the monitored non-GRIO utilisation of allocated non-GRIO bandwidth of one or more preceding distributed scheduling quanta. The controller daemon of the exemplary embodiment is further operable to receive requests specifying a quality of service characteristic required by the requesting process. For example a process request for 1 MB/100 ms carries a tighter quality of service requirement than a process request for 10 MB/s, despite having the same average data rate.

All I/O scheduling is done using local scheduling logic at each node. The present embodiment grants each node in the cluster the right to issue GRIO and non-GRIO I/O up to some maximum level, and periodically adjusts the rates for the non-GRIO I/O for each node. Other than receiving occasional updates from the DBA, a node operates independently and is free to schedule I/O up to its allocated limits in any manner it chooses. Provided the node does not violate its aggregate bandwidth allocation it will not jeopardise other reservations across the cluster.

Further, the present embodiment is interoperable with previous bandwidth reservation solutions such as the SGI GRIOv1 product. Both the earlier GRIOv1 implementation and the present embodiment will leverage a similar kernel infrastructure, but bandwidth reservation and the differing QoS features will be split between separate daemons running on the GRIOv2 server of the present embodiment. These run independently.

Accordingly, the present embodiment may be deployed in shared file systems alongside existing DAS file system management, and will provide a fallback should their applications need to be adapted to the new QoS regime of the present embodiment.

However, mixed operation of differing versions is forcibly prevented with a kernel interlock. Only one subsystem may be active at one time and once a particular behaviour has been activated it remains in force until the next reboot.

In the exemplary embodiment, when no GRIO streams are present in the cluster, a simple I/O scheduling regime is implemented by all nodes of the cluster, achieving performance characteristics comparable to those in existing shared file systems. However, once a GRIO stream is created or GRIO scheduling is explicitly activated, each node is triggered to switch to the GRIO strategy of the exemplary embodiment. In the present embodiment, of the total qualified bandwidth of the file system, a first portion is reserved by active GRIO streams, while a second portion is unreserved, and is thus available for use by non-GRIO streams. Thus, the controller daemon ggd2 encapsulates all I/O, whether GRIO or non-GRIO.

In the present embodiment asynchronous TCP CXFS kernel RPCs are used to communicate the non-GRIO allocation to each of the nodes. The controller daemon ggd2 of the server node can be seen as issuing short-term 'leases' for non-GRIO bandwidth, such that, in the absence of a further bandwidth allocation for a subsequent distributed scheduling quantum, each client node must voluntarily yield the allocated non-GRIO bandwidth. While this necessitates communication of non-GRIO bandwidth allocations to all nodes for every distributed scheduling quantum, the use of a relatively large value for the distributed scheduling quantum, such as of the order of seconds, avoids significant communications overhead.

In the absence of a further non-GRIO bandwidth allocation, each client node must either suspend all non-GRIO activity until a new non-GRIO bandwidth allocation is received, or fall back to a common cluster-wide configurable minimum data rate. Such a fall back minimum data rate may be set to a minimum bandwidth quantum allocated by the controller daemon ggd2, for example of the order of 64 KB/s. Such a fall back minimum data rate enables non-GRIO processes of each node to continue to make some forward progress even in the absence of an explicitly scheduled bandwidth. Such non-explicitly scheduled bandwidth can still be considered to be encapsulated by the controller daemon which is aware of the value of the minimum data rate of each client node, and indeed may be responsible for configuring its value.

Once each client node receives a non-GRIO bandwidth allocation it may issue one or more non-GRIO streams at any level up to that allocation for the duration of the distributed scheduling quantum. All non-GRIO activity of that node must be aggregated into a single stream and accommodated within the non-GRIO bandwidth allocation of that node. The single stream of aggregated non-GRIO activity is termed the non-GRIO stream for that node. The actual utilisation of the non-GRIO bandwidth allocation by each node is monitored by the bandwidth allocator, and taken into account in subsequent allocations of unreserved bandwidth to nodes for non-GRIO use.

It is noted that, as the node supporting the controller daemon ggd2 is simply one of a plurality of nodes of the cluster, that node will be both a client node and the server node. The dynamic bandwidth allocator treats non-GRIO streams of the server node in the same manner as non-GRIO streams of the client nodes.

Asynchronous kernel RPCs are used for notifying client kernels of their current dynamic bandwidth allocations. The RPCs are reliable TCP communications, however they are processed serially in the kernel through a possibly limited number of worker threads, and thus may arrive at client nodes with some degree of "clock skew". The exemplary embodiment accordingly issues bandwidth allocation reductions prior to bandwidth allocation increases, by an amount of time greater than a possible "clock skew" caused by asynchronous TCP kernel RPCs and kernel processing delay. While TCP RPC communications between the server kernel and the client kernels are reliable, such embodiments recognise that the serial processing of the RPCs within each kernel and the possibility of delays caused by a limited number of worker threads within a particular kernel can lead to differing arrival times of new bandwidth allocations at each node. A possible outcome of such differing arrival times is a transitory over subscription of the qualified bandwidth of the file storage. However, the exemplary embodiment caters for such varying arrival times by issuing reduced bandwidth allocations prior to increased bandwidth allocations, thus ensuring that transitory bandwidth loads are reduced relative to a steady state bandwidth load.

Within each client kernel, the management of non-GRIO for one or more file systems to which the client node is connected is low cost, and involves allocating a non-GRIO stream and updating the managed file system and hash table. On the I/O path every buffer is checked against the hash table. As soon as a particular device is entered into the kernel hash all non-GRIO buffers destined for that device begin being queued on its non-GRIO stream.

In the exemplary embodiment, a GRIO reservation may be released by a process or node should the reservation no longer be required by that process. Further, in the event of failure or shut down of a node, all bandwidth reservations held by that node are released. Additionally or alternatively, a quantity of bandwidth of a GRIO reservation may be increased or decreased by request during utilisation of the existing reservation. For example, where an application requires a high data rate to initially fill an in-memory buffer, the required data rate may be reduced once the buffer is full, after which the I/O data rate may proceed at a standard rate for that file type. The unmanage process simply involves removing the hash table entry, dropping the reference on the non-GRIO stream, and returning. If the non-GRIO stream has outstanding queued I/O, it is permissible for it to persist for some period of time after it is unmanaged until such time as all outstanding buffers have been completed, and have in turn dropped their references.

Once all reserved GRIO streams have become inactive, the GRIO scheduling can be inactivated/deactivated/rendered inactive across the cluster. That is, the exemplary embodiment provides for on-demand GRIO management, such that the kernel scheduler is inactive unless an explicit request for a bandwidth reservation has been made or a granted bandwidth reservation is in place. Thus, the controller daemon activates upon receipt of a node request for a bandwidth reservation, and deactivates upon the record of existing bandwidth reservations becoming empty.

In the exemplary embodiment, the controller daemon is a user-level process started at system boot.

In implementing a shared file system in accordance with the exemplary embodiment, all logical units (LUNs) of a particular device should be managed as a GRIO file system. If only a subset of the LUNs are GRIO managed, hardware contention between unmanaged LUNs and GRIO managed LUNs may still cause over subscription of that device, thus potentially exceeding the qualified bandwidth and violating I/O rate guarantees. Similarly, a GRIO managed storage device servicing one cluster should not be shared with another cluster, as I/O demands from the two uncoordinated clusters can cause the qualified bandwidth to be exceeded.

While the exemplary embodiment has been described with reference to a SAN, the file storage may in alternate embodiments comprise directly attached storage, for example operating under the XFS file system. That is, alternate embodiments may be applied in respect of directly attached storage (DAS) of a node such as SCSI JBODs, Fibre Channel JBODs or RAIDs, accessed by a plurality of processes of the node.

Further, while the exemplary embodiment finds particular application in conjunction with the existing heterogeneous CXFS filesystem of SGI, it is to be appreciated that alternate embodiments may be applied with any heterogeneous shared filesystem, homogeneous shared filesystem, or DAS.

While the exemplary embodiment has been described for use in conjunction with SGI CXFS and XVM software products, the invention is not limited for application with SGI software or hardware.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method for controlling utilisation of file storage by a plurality of processes, comprising:
    establishing a controller daemon;
    empirically determining a qualified bandwidth of the file storage;
    the controller daemon maintaining a record of existing bandwidth reservations;
    receiving at the controller daemon a request for a bandwidth reservation for access to the file storage by a process;
    the controller daemon determining whether granting the request would result in a sum of bandwidth reservations which exceeds the qualified bandwidth; and
    provided the qualified bandwidth would not be exceeded by granting the request, the controller daemon granting the request for bandwidth reservation.

2. The method of claim 1, wherein the qualified bandwidth is determined by:
    setting the qualified bandwidth to an initial value;
    applying a test workload equal to the initial value to the file storage;
    monitoring delivered I/O performance; and
    refining the qualified bandwidth in response to the delivered I/O performance.

3. The method of claim 2 wherein the initial value is determined to be a fraction of fixed storage component bandwidth parameters.

4. The method of claim 1 wherein the qualified bandwidth is determined by iteratively:
    applying a test workload equal to the qualified bandwidth and determining whether quality of service requirements are met by a present value of the qualified bandwidth; and
    provided quality of service requirements are met, increasing the qualified bandwidth.

5. The method of claim 1, further comprising monitoring at least one I/O metric of an I/O stream utilizing a granted bandwidth reservation, the at least one I/O metric being chosen from:
    minimum observed bandwidth in a sample interval;
    maximum observed bandwidth in a sample interval;
    most recent observed bandwidth in the sample interval;
    minimum observed I/O service time in the sample interval;
    maximum observed I/O service time in the sample interval; and
    most recent observed I/O service time in the sample interval.

6. The method of claim 5 wherein the sample interval is defined by a number of I/Os, up to a user configurable maximum.

7. The method of claim 5 wherein the sample interval is defined as a time, up to a user configurable maximum.

8. The method of claim 1 wherein the request for the bandwidth reservation comprises specifications of a required quality of service of the reservation, the method further comprising:
   the controller daemon determining whether the specifications of the required quality of service can be met; and
   provided the specifications of the required quality of service can be met, granting the request for bandwidth reservation.

9. A computer program product for use on a computer system for implementing a controller daemon for controlling utilization of file storage by a plurality of processes, the computer program product comprising a tangible computer usable medium having computer readable program code thereon, the computer readable program code comprising:
   code for recording an empirically determined qualified bandwidth of the file storage;
   code for maintaining a record of existing bandwidth reservations;
   code for receiving at the controller daemon a request for a bandwidth reservation for access to the file storage by a process;
   code for determining whether granting the request would result in a sum of bandwidth reservations which exceeds the qualified bandwidth; and
   code for granting the request for bandwidth reservation, provided the qualified bandwidth would not be exceeded by granting the request.

10. A shared file system comprising:
   a storage area network having a file volume; and
   a plurality of nodes sharing access to the file volume;
   wherein one of said nodes is configured as a controller node which stores an empirically determined qualified bandwidth of the file volume and maintains a record of existing bandwidth reservations;
   wherein each of the plurality of nodes is configured to make a request to the controller node for a bandwidth reservation for access to the file volume;
   wherein the controller node is configured to determine whether granting a node request for bandwidth reservation would result in a sum of bandwidth reservations which exceeds the qualified bandwidth; and
   wherein the controller node is configured to grant the node request for bandwidth reservation, provided the qualified bandwidth would not be exceeded by granting the node request.

11. A method for controlling utilisation of shared file storage by a plurality of nodes, comprising:
   establishing a controller daemon on a first node;
   empirically determining a qualified bandwidth of the shared file storage;
   the controller daemon maintaining a record of existing bandwidth reservations;
   receiving at the controller daemon a request for a bandwidth reservation for access to the file storage by a process of one of the nodes;
   the controller daemon determining whether granting the request would result in a sum of bandwidth reservations which exceeds the qualified bandwidth;
   provided the qualified bandwidth would not be exceeded by granting the request, the controller daemon granting the request for bandwidth reservation; and
   in the event of failure of the controller daemon, establishing the controller daemon on a second node.

* * * * *

UNITED STATES PATENT AND TRADEMARK OFFICE
CERTIFICATE OF CORRECTION

PATENT NO. : 7,590,775 B2  
APPLICATION NO. : 10/912722  
DATED : September 15, 2009  
INVENTOR(S) : Gildfind et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1346 days.

Signed and Sealed this

Twenty-first Day of September, 2010

David J. Kappos  
*Director of the United States Patent and Trademark Office*